(12) United States Patent
Haeffner

(10) Patent No.: US 10,920,996 B2
(45) Date of Patent: Feb. 16, 2021

(54) DETECTION AND QUANTIFICATION OF DOMESTIC HOT WATER USE

(71) Applicant: SUEZ GROUPE, Paris la Defense (FR)

(72) Inventor: Hugues Haeffner, Boulogne Billancourt (FR)

(73) Assignee: SUEZ GROUPE, Paris la Defense (FR)

( * ) Notice: Subject to any disclaimer, the term of this patent is extended or adjusted under 35 U.S.C. 154(b) by 296 days.

(21) Appl. No.: 16/072,093

(22) PCT Filed: Jan. 2, 2017

(86) PCT No.: PCT/EP2017/050007
§ 371 (c)(1),
(2) Date: Jul. 23, 2018

(87) PCT Pub. No.: WO2017/129378
PCT Pub. Date: Aug. 3, 2017

(65) Prior Publication Data
US 2019/0041068 A1 Feb. 7, 2019

(30) Foreign Application Priority Data
Jan. 25, 2016 (FR) ..................................... 16 50552

(51) Int. Cl.
*H05B 1/02* (2006.01)
*F24D 19/10* (2006.01)
(Continued)

(52) U.S. Cl.
CPC ......... *F24D 19/1063* (2013.01); *F24D 17/00* (2013.01); *G01F 15/068* (2013.01); *G01F 15/075* (2013.01); *G05B 15/02* (2013.01)

(58) Field of Classification Search
CPC .... F24D 19/1063; F24D 17/00; G01F 15/008; G01F 15/075; G01F 15/02; H05B 1/02; H05B 1/0244
(Continued)

(56) References Cited

U.S. PATENT DOCUMENTS 4,936,289 A * 6/1990 Peterson ............. F24D 19/1054
122/13.3
5,948,304 A * 9/1999 Bradenbaugh ..... G05D 23/1909
219/430
(Continued)

FOREIGN PATENT DOCUMENTS

GB 2 434 207 A 7/2007
WO 2011/152784 A1 12/2011
WO 2014/064556 A1 5/2014

OTHER PUBLICATIONS

International Search Report, dated Mar. 27, 2017, from corresponding PCT/EP2017/050007 application.

*Primary Examiner* — Mark H Paschall
(74) *Attorney, Agent, or Firm* — Nixon & Vanderhye

(57) ABSTRACT

Disclosed is a method for detecting domestic hot water use by a sanitary fitting during an observation period by analysing data relative to volumes of water passing through a water meter, the method including: receiving a first item of data, noted VΔ1, representing the maximum volume of fluid measured over a predetermined period, preferably equal to 5 minutes; receiving a second item of data, noted VΔ2, representing the maximum volume of fluid measured by the meter during another predetermined period, preferably equal to 15 minutes; and detecting that domestic hot water has been used when VΔ1>15 litres and VΔ2≥20 litres.

20 Claims, 1 Drawing Sheet

(51) Int. Cl.
  *G01F 15/06*  (2006.01)
  *G01F 15/075* (2006.01)
  *F24D 17/00*  (2006.01)
  *G05B 15/02*  (2006.01)
(58) Field of Classification Search
  USPC .............. 219/497, 492, 412–414, 483, 506
  See application file for complete search history.

(56) References Cited

U.S. PATENT DOCUMENTS

| | | | |
|---|---|---|---|
| 6,375,087 B1 * | 4/2002 | Day | F24D 19/1051 |
| | | | 122/447 |
| 8,162,236 B2 * | 4/2012 | Rodenbeck | E03C 1/057 |
| | | | 239/390 |

* cited by examiner

DETECTION AND QUANTIFICATION OF DOMESTIC HOT WATER USE

FIELD OF THE INVENTION

The invention relates to the field of data analysis of water consumption by a private individual.

More specifically, the present invention relates to a method and a device enabling the use of domestic hot water of an equipment using water during a reference duration to be detected and measured.

STATE OF PRIOR ART

Methods are known for detecting and measuring use of domestic hot water of an equipment using water from devices install upstream and in series at this equipment. It is thus known to install a water meter at the piping feeding a shower with hot water to perform the detection and the measurement of use of hot water for this shower.

Installing such a water meter requires an intervention on the water distribution system as close as possible to the equipment. This intervention generates expenses in terms of equipment and requires to obtain an intervention permission and to temporarily stop the hot water distribution system.

The invention has in particular the purpose to overcome all or part of the drawbacks of the techniques of prior art.

DISCLOSURE OF THE INVENTION

One purpose of the invention is achieved with, according to the first aspect of the invention, a method for detecting use of domestic hot water by an equipment using water during a reference duration by analyzing data related to water volumes passing through a water meter disposed upstream of a water distribution system feeding said equipment, said method comprising:
- a first step of receiving a first datum, noted $V\Delta1$, representing the maximum fluid volume measured by the water meter during a predetermined duration, called a short duration, during the reference duration, the short duration, noted $\Delta1$, being between 2.0 and 7.0 minutes, and preferably substantially equal to 5 minutes,
- a second step of receiving a second datum, noted $V\Delta2$, representing the maximum fluid volume measured by the water meter during another predetermined duration, called a long duration, during the reference duration, the long duration, noted $\Delta2$, being between 10.0 and 30.0 minutes, and preferably equal to 15 minutes,
- a step of detecting a use of domestic hot water, a use of domestic hot water being said "detected" when:
  - on the one hand, a first condition is fulfilled, according to which the first datum $V\Delta1$ is higher than or equal to a first characteristic threshold chosen between 10 and 20 litres, and
  - on the other hand, a second condition is fulfilled, according to which the second datum $V\Delta2$ is higher than or equal to a second characteristic threshold, said second characteristic threshold being higher than or equal to the first characteristic threshold.

Preferably, the first characteristic threshold is between $4+2\times\Delta1$ and $8+2\times\Delta1$.

Advantageously, the second characteristic threshold is comprised between 15 and 25 litres, preferably substantially equal to 20 litres.

The first condition relates to the volume consumed for the short duration and is defined to dissociate the use of domestic hot water from other limited uses. The duration $\Delta1$ can be chosen as higher than the duration of the limited uses, typically 2 minutes, and lower than the duration of use of domestic hot water, typically between 2 and 7 minutes.

The second condition ensures that the volume consumed is sufficiently high to correspond to a use of domestic hot water because the duration $\Delta2$ is higher than the total duration of the use of domestic hot water.

The step of receiving the first datum can occur before or after the step of receiving the second datum. Both reception steps can thus concomitantly occur. For example, the first and second data can be received in a data frame by means for receiving a server.

The first and second data can be generated by the water meter disposed upstream of the water distribution system. This water meter is called a general water meter in literature.

The water meter disposed upstream of the water distribution system can comprise emission means configured to emit the first and second data.

Typically, the short and long durations of the general water meter are respectively five minutes and fifteen minutes.

Preferably, the step of detecting (E2) a use of domestic hot water further includes verifying a third condition according to which a use of domestic hot water is detected when the ratio $(V\Delta2\times\Delta1)/(V\Delta1\times\Delta2)$ is substantially lower than 1, for example lower than a threshold between 0.8 and 0.9.

This third condition enables the use of domestic hot water to be dissociated from very long uses with a duration higher than $\Delta2$ not corresponding to domestic hot water such as filling a swimming pool, plant watering, abundant washing.

The method according to the invention can include determining the flow rate of domestic hot water during the reference time from the first datum, the flow rate of domestic hot water being determined by the ratio of the maximum fluid volume $V\Delta1$ to the duration $\Delta1$.

The method according to the invention can include determining the volume of domestic hot water used by the equipment during a use for the reference time from the second datum, the volume of domestic hot water being determined by the maximum fluid volume $V\Delta2$.

According to a second aspect of the invention, a method is provided, including iterating the method just described and statistically processing data of water domestic flow rates and volumes determined to determine an estimator of the domestic hot water flow rate and volume consumed by the equipment during a mean use. This number of iterations can for example be higher than 7 to have sufficiently detected events and lower than 60 to relate to a homogeneous period of use.

An estimator of the mean of the flow rates and volumes consumed can be determined for example by calculating the mean of flow rates and volumes consumed or the median of the flow rates and volumes consumed, or a percentile of the flow rates and volumes consumed.

Of course, the statistical processing can determine other statistical data, such as for example a moment with an order higher than 2 of the flow rates and volumes consumed or a percentile.

According to a third aspect of the invention, it is provided a device for detecting use of domestic hot water by an equipment using water during a reference duration by analyzing data related to water volumes passing through a water meter disposed upstream of a water distribution system feeding said equipment, said device comprising:
- a first reception module for receiving a first datum, noted $V\Delta1$, representing the maximum fluid volume measured by the water meter for a predetermined duration, called a short duration, during the reference duration, the short duration, noted dl, being between 2.0 and 7.0 minutes, and preferably substantially equal to 5 minutes, a second reception module configured to receive a second datum, noted $V\Delta 2$, representing the maximum fluid volume measured by the water meter for another predetermined duration, called a long duration, during the reference duration, the long duration, noted 62, being between 10.0 and 30.0 minutes, and preferably equal to 15 minutes, a detection module for detecting a use of domestic hot water configured to detect a use of domestic hot water when:

on the one hand, a first condition is fulfilled, according to which the first datum $V\Delta 1$ is higher than or equal to a first characteristic threshold chosen between 10 and 20 litres, and on the other hand, a second condition is fulfilled, according to which the second datum $V\Delta 2$ is higher than or equal to a second characteristic threshold, said second characteristic threshold being higher than or equal to the first characteristic threshold.

The reception modules can decode data received by receivers, in a wired or wireless way. They can be distinct or be made by a single reception module which is configured to receive the first and second data.

The detection module can be made by a processing unit, for example a microprocessor.

Preferably, the first characteristic threshold is between $4+2\times\Delta 1$ and $8+2\times\Delta 1$.

Advantageously, the second characteristic threshold is between 15 and 25 litres, preferably substantially equal to 20 litres.

In one embodiment, the short duration is between 2.0 and 7.0 minutes, and preferably substantially equal to 5 minutes, and the long duration is between 10.0 and 30.0 minutes, and preferably equal to 15 minutes.

Preferably, the detection module for detecting use of domestic hot water is further configured to verify a third condition according to which a use of domestic hot water is detected when the ratio $(V\Delta 2\times\Delta 1)/(V\Delta 1\times\Delta 2)$ is substantially lower than 1.

Advantageously, the ratio $(V\Delta 2\times\Delta 1)/(V\Delta 1\times\Delta 2)$ is lower than a threshold between 0.8 and 0.9.

Preferably, the device further comprises a module for determining the domestic hot water flow rate and the domestic hot water volume used by the equipment during the reference duration configured to determine said flow rate and volume from the first and second data, the domestic hot water flow rate being determined by the ratio of the maximum fluid volume $V\Delta 1$ to the duration $\Delta 1$, the volume of domestic hot water being determined by the maximum fluid volume $V\Delta 2$.

According to a fourth aspect of the invention, it is provided a system comprising:

at least one equipment using water during a reference duration;

a water meter disposed upstream of a water distribution system feeding the equipment;

a server configured to receive data emitted by the water meter;

a device according to the invention, preferably integrated to the server.

A module for receiving the server, usually configured to receive the data emitted by the water meter, can be configured to carry out the functions of the reception modules of the device according to the invention.

Alternatively, the reception module(s) of the device according to the invention can be distinct from a reception module of the server.

A processing module of the server, for example a microprocessor, usually configured to process data emitted by the water meter, can be configured to carry out the functions of the detection module of the device according to the invention and/or of the module for determining the flow rate of domestic hot water and/or the volume of domestic hot water.

According to yet another aspect of the invention, it is provided a computer program product directly loadable in the internal memory of a computer, comprising software code portions for running the steps of the method according to one of the preceding claims, when the program is run on a computer.

DESCRIPTION OF THE FIGURES

Further features and advantages of the invention will appear upon reading the detailed description of implementations and embodiments in no way limiting, with regard to the appended figures in which.

DESCRIPTION OF THE INVENTION

Since these embodiments are in no way limiting, alternatives of the invention could in particular be made, which alternatives only comprise a selection of characteristics described in the following, as described or generalised, isolated from the other characteristics described, if this selection of characteristics is sufficient to provide a technical advantage or to differentiate the invention with respect to the state of the art.

Figure 1:
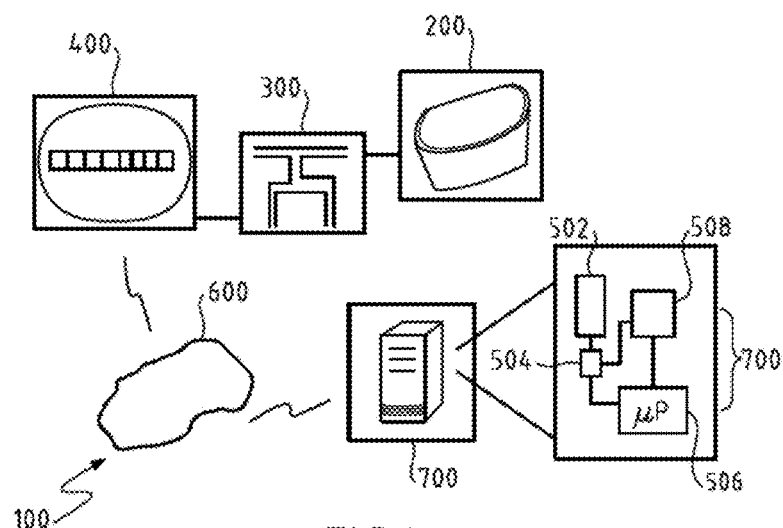
FIG. 1 illustrates a system according to the invention.

In the example represented in FIG. 1, a system 100 according to the invention is illustrated, comprising:

an equipment 200 using domestic hot water, here a bathtub, fed by a water distribution system 300;

a water meter 400 disposed upstream of the water distribution system 300 feeding the bathtub 200;

a server 500 configured to receive data emitted by the water meter 400 by means of a network 600;

a device for detecting use of domestic hot water 700 integrated to the server in this exemplary embodiment. The device 700 can be housed anywhere else than in the server.

The reference duration is, in the example represented, 24 hours.

The network 600 is typically a radio network. In this case, not further represented, the water meter 400 includes a transducer capable of converting a mechanical signal generated by the fluid movement into an electrical signal emitted by a radio emitter disposed within the water meter.

The signal emitted by the water meter is then propagated by the network 600 and received by the server 500 by means of a radio receiver.

Usually, the water meter 400 generates a data frame including two maximum consumption volumes, respectively within 5 and 15 minutes during the reference duration. This frame is received by a reception unit 502 of the server 500, such as a network interface card 502.

The server comprises a reception module 504 which is configured to receive the data emitted by the water meter 400.

The server further comprises a microprocessor 506 which is configured to process data emitted by the water meter 400 and received via the reception module 504.

In the example represented, the device 700 comprises a reception module 508 configured to:
- receive a first datum representing the maximum fluid volume, noted $V\Delta1$, measured by the water meter 400 for the duration of 5 minutes,
- receive a second datum representing the maximum fluid volume, noted $V\Delta2$, measured by the water meter 400 for the duration of 15 minutes.

The microprocessor 506 is further configured to process the first and second data received from the reception module 508. The microprocessor 506 is part of the device 700 in the embodiment illustrated.

Figure 2:
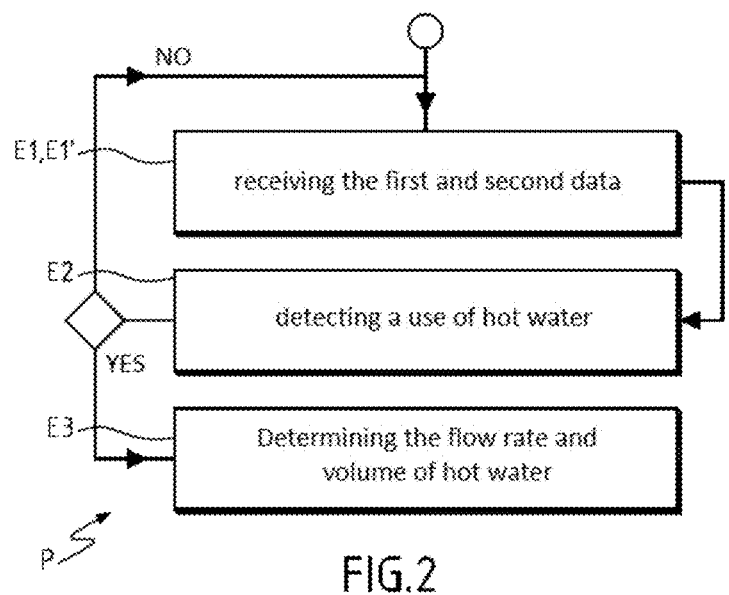
FIG. 2 illustrates a method according to the invention implemented in the system represented in FIG. 1.

In reference to FIG. 2, a method according to the invention implemented by the system according to the invention is illustrated.

According to this method, it is implemented an iteration, for forty days, of a method P for determining flow rate and volume of domestic hot water which will be described hereinafter and a statistical processing of the data of flow rates and volumes of domestic hot water determined to determine an estimator of the flow rate and volume of domestic hot water consumed by the equipment during the reference duration of 24 hours.

The method P for determining flow rate and volume of domestic hot water comprises:
- receiving E1 and E1' the first and second data by the reception module 508,
- detecting E2 use of domestic hot water,
- if a detection E2 is positive, determining E3 the flow rate and volume of domestic hot water consumed,
- otherwise returning to the reception step E1.

The processing unit 506 configured to perform the detection E2 comprises, in the example represented, the following three tests:
- test 1: $V\Delta1 \geq 15$;
- test 2: $V\Delta2 \geq 20$; and
- test 3: $5V\Delta2/15V\Delta1 \leq 12/15$.

The first test has the purpose of verifying that the flow rate is sufficient to characterise a use of domestic hot water. The second test has the purpose of verifying that the water volume consumed is sufficient to characterise a use of domestic hot water. The third test has the purpose of verifying that the duration of the use is lower than 12 minutes, which corresponds, according to the invention, to a maximum duration of use of domestic hot water.

The processing unit 506 is configured to perform step E3, according to which the flow rate of domestic hot water is determined by the ratio of the maximum fluid volume $V\Delta1$ to the duration $\Delta1$, the volume of domestic hot water being determined by the maximum fluid volume $V\Delta2$.

The statistical processing of the data of flow rates and volumes of domestic hot water determined is made by the processing unit 506 and enables an estimator of the mean of the flow rate and volume of domestic hot water consumed by the equipment during a mean usage to be determined.

According to the method P just described, step E1 is implemented as soon as the server receives new data via the reception module 504, itself connected to the network interface card 502. Thereby, this is a method which is implemented in real time.

However, the method described can be easily adapted, without departing from the scope of the invention, by considering a reception module 504 connected to a database which would include first and second values recorded beforehand.

According to one embodiment of the invention, it is provided a computer program product directly loadable in the internal memory of a computer, comprising software code portions for running the steps of the method according to one of the preceding claims, when the program is run on a computer.

Of course, the invention is not limited to the examples just described and many modifications could be provided to those examples without departing from the scope of the invention. In addition, the different characteristics, forms, alternatives and embodiments of the invention can be associated to each other according to various combinations insofar as they are not incompatible or exclusive to each other.

The invention claimed is:

1. A method (P) for detecting use of domestic hot water by an equipment (200) using water during a reference duration by analyzing data related to water volumes passing through a water meter (400) disposed upstream of a water distribution system (300) feeding said equipment, said method comprising:
   a first step of receiving (E1) a first datum, noted $V\Delta1$, representing the maximum fluid volume measured by the water meter during a first predetermined duration, called a short duration, noted $\Delta1$, during the reference duration,
   a second step of receiving (E1') a second datum, noted $V\Delta2$, representing the maximum fluid volume measured by the water meter during a second predetermined duration, called a long duration, noted $\Delta2$, during the reference duration,
   a step of detecting (E2) a use of domestic hot water, a use of domestic hot water being said "detected" when:
      on the one hand, a first condition is fulfilled, according to which the first datum $V\Delta1$ is higher than or equal to a first characteristic threshold chosen between 10 and 20 litres, and
      on the other hand, a second condition is fulfilled, according to which the second datum $V\Delta2$ is higher than or equal to a second characteristic threshold, said second characteristic threshold being higher than or equal to the first characteristic threshold.

2. The method according to claim 1, wherein the first characteristic threshold is between $4+2\times\Delta1$ and $8+2\times\Delta1$.

3. The method according to claim 1, wherein the second characteristic threshold is comprised between 15 and 25 litres.

4. The method according to claim 1, wherein the short duration is between 2.0 and 7.0 minutes, and preferably substantially equal to 5 minutes, and the long duration is comprised between 10.0 and 30.0 minutes, and preferably equal to 15 minutes.

5. The method according to claim 1, wherein the step of detecting (E2) a use of domestic hot water further includes verifying a third condition according to which a use of domestic hot water is detected when the ratio $(V\Delta2\times\Delta1)/(V\Delta1\times\Delta2)$ is substantially lower than 1.

6. The method according to claim 5, wherein the ratio $(V\Delta2\times\Delta1)/(V\Delta1\times\Delta2)$ is lower than a threshold between 0.8 and 0.9.

7. The method according to claim 1, further including a step of determining (E3) the flow rate of domestic hot water and the volume of domestic hot water used by the equipment during the reference duration from the first and second data, the flow rate of domestic hot water being determined by the ratio of the maximum fluid volume $V\Delta 1$ to the duration $\Delta 1$, the volume of domestic hot water being determined by the maximum fluid volume $V\Delta 2$.

8. A method comprising iterating a method (P) according to claim 7 and statistically processing the data of domestic flow rates and volumes of water determined to determine an estimator of the rate and volume of domestic hot water flow consumed by the equipment during a mean use of the equipment.

9. The method according to claim 3, wherein the second characteristic threshold is substantially equal to 20 litres.

10. The method according to claim 4, wherein the short duration is substantially equal to 5 minutes.

11. The method according to claim 10, wherein the long duration is equal to 15 minutes.

12. A device (700) for detecting use of domestic hot water by an equipment using water during a reference duration by analyzing data related to water volumes passing through a water meter disposed upstream of a water distribution system feeding said equipment, said device comprising:
- a reception module (508) configured to receive a first datum, noted $V\Delta 1$, representing the maximum fluid volume measured by the water meter for a predetermined duration, called a short duration, during the reference duration,
- a reception module (508) configured to receive a second datum, noted $V\Delta 2$, representing the maximum fluid volume measured by the water meter for another predetermined duration, called a long duration, during the reference duration,
- a detection module (506) for detecting a use of domestic hot water configured to detect a use of domestic hot water when:
  - on the one hand, a first condition is fulfilled, according to which the first datum $V\Delta 1$ is higher than or equal to a first characteristic threshold chosen between 10 and 20 litres, and
  - on the other hand, a second condition is fulfilled, according to which the second datum $V\Delta 2$ is higher than or equal to a second characteristic threshold, said second characteristic threshold being higher than or equal to the first characteristic threshold.

13. The device according to claim 12, wherein the first characteristic threshold is between $4+2\times\Delta 1$ and $8+2\times\Delta 1$.

14. The device according to claim 12, wherein the second characteristic threshold is between 15 and 25 litres.

15. The device according to claim 12, wherein the short duration is between 2.0 and 7.0 minutes, and the long duration is between 10.0 and 30.0 minutes.

16. The device according to claim 12, wherein the detection module for detecting use of domestic hot water is further configured to verify a third condition according to which a use of domestic hot water is detected when the ratio $(V\Delta 2\times\Delta 1)/(V\Delta 1\times\Delta 2)$ is substantially lower than 1.

17. The device according to claim 16, wherein the ratio $(V\Delta 2\times\Delta 1)/(V\Delta 1\times\Delta 2)$ is lower than a threshold comprised between 0.8 and 0.9.

18. The device according to claim 12, further including a determination module for determining the domestic hot water flow rate and the domestic hot water volume used by the equipment during the reference duration configured to determine said flow rate and volume from the first and second data, the domestic hot water flow rate being determined by the ratio of the maximum fluid volume $V\Delta 1$ to the duration $\Delta 1$, the volume of domestic hot water being determined by the maximum fluid volume $V\Delta 2$.

19. A system comprising:
- at least one equipment (200) using water during a reference duration;
- a water meter (400) disposed upstream of a water distribution system (300) feeding said equipment;
- a server (700) configured to receive data emitted by said water meter;
- a device (700) according to claim 12.

20. A non-transitory computer-readable medium on which is stored a computer program directly loadable in the internal memory of a computer, comprising software code portions for running the steps of the method according to claim 1, when said program is run on a computer.

* * * * *